(12) United States Patent
Militz et al.

(10) Patent No.: US 6,731,921 B1
(45) Date of Patent: May 4, 2004

(54) CIRCUIT FOR CHANGING OVER BETWEEN RECEIVING ANTENNAS

(75) Inventors: Uwe Militz, Berlin (DE); Carsten Zeitz, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/049,218

(22) PCT Filed: Jul. 21, 2000

(86) PCT No.: PCT/DE00/02370

§ 371 (c)(1),
(2), (4) Date: Jun. 14, 2002

(87) PCT Pub. No.: WO01/10057

PCT Pub. Date: Feb. 8, 2001

(30) Foreign Application Priority Data

Jul. 29, 1999 (DE) .......................................... 199 35 675

(51) Int. Cl.⁷ ................................................ H04B 1/06
(52) U.S. Cl. ................. 455/277.2; 455/134; 455/277.1; 375/347
(58) Field of Search ................... 455/273.2, 132, 455/133, 134, 135, 142, 277.1, 101; 375/347

(56) References Cited

U.S. PATENT DOCUMENTS

| | | | | |
|---|---|---|---|---|
| 4,499,606 A | * | 2/1985 | Rambo .................. | 455/277.2 |
| 4,549,311 A | * | 10/1985 | McLaughlin ............ | 455/277.1 |
| 4,633,519 A | * | 12/1986 | Gotoh et al. ............ | 455/277.2 |
| 4,876,743 A | * | 10/1989 | Lindenmeier et al. ...... | 455/133 |
| 5,161,252 A | * | 11/1992 | Higuchi et al. ............. | 455/78 |
| 5,203,026 A | * | 4/1993 | Ekelund .................... | 455/134 |
| 5,561,673 A | * | 10/1996 | Takai et al. ................ | 714/708 |
| 5,799,042 A | * | 8/1998 | Xiao ......................... | 375/285 |
| 5,940,454 A | * | 8/1999 | McNicol et al. ........... | 375/347 |
| 6,169,888 B1 | * | 1/2001 | Lindenmeier et al. ... | 455/277.2 |
| 6,185,435 B1 | * | 2/2001 | Imura ...................... | 455/552.1 |

FOREIGN PATENT DOCUMENTS

| DE | 35 17 247 | 11/1986 |
|---|---|---|
| DE | 36 41 109 | 8/1988 |
| DE | 44 03 612 | 8/1995 |
| DE | 89 16 287 | 8/1997 |

* cited by examiner

Primary Examiner—Charles Appiah
(74) Attorney, Agent, or Firm—Kenyon & Kenyon

(57) ABSTRACT

A circuit for changing over between the frequency-modulated HF signals of at least two receiving antennas is described, having a control unit that changes over between the individual antennas as a function of the quality of the antenna output signal. A detector is provided which, when a signal that exceeds the defined reception level is no longer being furnished by any of the antennas, applies to the control unit a signal that effects the changeover to a specific antenna.

13 Claims, 1 Drawing Sheet

CIRCUIT FOR CHANGING OVER BETWEEN RECEIVING ANTENNAS

FIELD OF THE INVENTION

The present invention refers to a circuit for changing over between the frequency-modulated HF signals of at least two receiving antennas.

BACKGROUND INFORMATION

A circuit is known from German Published Patent Application No. 35 17 247. This document describes an antenna diversity system for mobile reception of frequency-modulated HF signals, in which the diversity functions are integrated into a processor. The processor changes over from one antenna to the next when it detects interference in the audio signal simultaneously with a level fluctuation in the HF signal.

This procedure has the disadvantage, however, that in the case of a very weak signal, which as a rule is accompanied by noise in the audio signal and severe level fluctuations in the HF signal, a continual changeover between the antennas occurs. This continuous changeover in turn results in audible interference.

A remedy for this phenomenon is described in German Utility Model 89 16 287. According to this document, a threshold switch is used which switches the diversity processor back to the main antenna when the reception level at the antenna presently switched on falls below a defined value. Control is effected via the mode input of the processor, which is provided so that a fixed antenna can be switched on for AM reception. The diversity function is switched back on when a second defined level, which is greater than the first one by a specific value, is exceeded.

The consequence of this procedure is that the main antenna is switched in each time the level falls below the first threshold, and the diversity function is thus initially disabled. In some circumstances, additional connected antennas that might still furnish an interference-free reception signal are disregarded in this context. If the level of the main antenna remains below the second, higher level threshold, the diversity function is not restarted.

SUMMARY OF THE INVENTION

It is the object of the present invention to develop a circuit for changing over between the frequency-modulated HF signals of at least two receiving antennas in such a way that interference resulting from excessively frequent changing over or unnecessary changing over to a fixed antenna is avoided.

According to the present invention, the antenna diversity system is changed over to a fixed antenna only when it is certain that interference-free reception can no longer be guaranteed with any of the connected antennas.

According to the present invention, therefore, a detector is provided which, when a signal that exceeds the defined reception level is no longer being furnished by any of the antennas, applies to the control unit a signal that effects the changeover to a specific antenna (hereinafter referred to as the "fixed antenna").

This ensures that all the antennas are first checked for an interference-free signal. If none of the antennas is furnishing a sufficient signal, the present invention prevents continual changing over between the antennas from resulting in audible interference, and possibly even further degrading the reception of a weak transmitter.

The advantage of the present invention lies in the fact that a switching operation back to the main antenna occurs only when an HF signal of sufficient magnitude to guarantee interference-free reception is not present at any antenna. Only in this situation is it advisable to change over to a fixed antenna (also not interference-free) in order to suppress the additional audible interference that occurs with continuous changing over.

In a preferred development, the diversity function is not switched back on until the antenna signal again exceeds the level threshold for a defined period of time.

Several embodiments are possible for the detector; two possibilities therefor are described below by way of example:

For example, the detector can evaluate the level-equivalent DC voltage from the demodulator of the antenna diversity circuit. This evaluation system contains a threshold switch that detects when the level falls below a defined antenna minimum. It is preceded by a time delay; the latter ensures that a changeover to a fixed antenna occurs only when the level falls below the threshold for a period of time that corresponds at least to the time required by the processor to poll all the connected antennas.

The time delay can be embodied, for example, as an integrator. The simplest instance is a lowpass filter, the threshold switch being constituted by an operational amplifier connected as a comparator.

In a development, the comparator can be preceded by a further comparator. The latter ensures that integration does not begin until the value actually falls below the threshold. If the integrator is connected directly to the level output of the demodulator, this has the disadvantage that the delay time depends on the magnitude of the voltage jump. This time is particularly short if the level-equivalent voltage is slowly approaching the threshold value, since the capacitor of the integration member is already charged almost to the defined threshold value.

In an alternative embodiment, the detector evaluates the switching speed of the diversity processor. This is done by monitoring the control output terminals of the processor. If a specific number of switching operations is initiated in a defined time, operation is changed over to a fixed antenna.

In particular, it is possible to connect the detector to only one control output terminal of the diversity processor. Since the diversity processor always switches the antennas on and off in the same sequence, this is sufficient for ascertaining the switching frequency and thus a criterion for changing over to a fixed antenna.

Several embodiments are also possible for selecting the fixed antenna, some of which are cited below by way of example and not exhaustively:

In the simplest case, the main antenna (AM+FM) is used as the fixed antenna. The diversity processor possesses a mode input with which, by way of a DC voltage during AM reception, it can be switched to the main antenna. This changeover capability is also used when interference-free reception is no longer possible with any of the connected antennas.

In an alternative, the fixed antenna to which a changeover is made is the antenna with the best reception. In order to identify that antenna, the antenna that was switched in for the longest time at the last pass is detected.

For detection of the best antenna, a storage element is connected to each control output terminal of the processor; in the simplest case it is a charging capacitor. This storage element is overwritten again at each pass. When changeover to the fixed antenna is to occur, the memories are compared and that antenna which was switched on for the longest time is used as the fixed antenna. In order to switch in any desired antenna, the diversity processor is switched off and the control line for the corresponding antenna is switched to the supply voltage.

DETAILED DESCRIPTION

Figure 1:
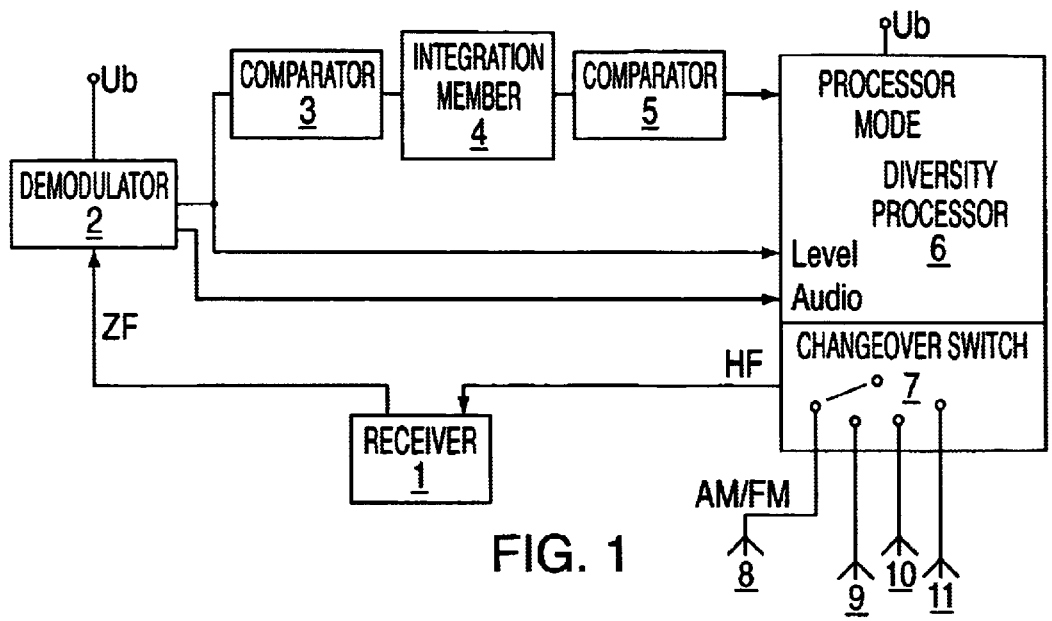
FIG. 1 shows an exemplary embodiment of the present invention.

FIG. 1 shows a block diagram of a circuit with level-jump-independent antenna level detection, and with a switchback function to the main antenna.

In this—with no limitation as to general applicability—four antennas 8, 9, 10, and 11 are used. Antenna 8 is a main antenna suitable for AM and FM reception, whereas antennas 9, 10, and 11 are designed only for FM reception.

The HF signal of the present antenna 8, 9, 10, or 11 (i.e. the one presently switched on via a changeover network 7), processed in the FM tuner and IF amplifier, is demodulated in a demodulator 2 of the antenna diversity circuit. The audio signal and the level-equivalent DC voltage (level) from the demodulator are conveyed to a diversity processor 6. The latter recovers therefrom the information as to when a changeover to the next antenna is to occur. It controls changeover network 7, which switches in antenna 8, 9, 10, or 11.

The level-proportional DC voltage is also conveyed to a comparator 3. The latter switches to HIGH when the level falls below a certain threshold. Downstream from it is a lowpass filter 4 that acts as an integration member. Integration member 4 determines, with its time constant, how long the level is to below the threshold until a second threshold value is reached so that a second comparator 5 goes to HIGH. The latter controls the processor mode. If the level remains below the threshold for a defined time, processor 6 is permanently switched to main antenna 8.

This prevents the processor from continually changing over between the antennas in the context of a weak reception level at which switching noise is just becoming audible. When the antenna signal at the main antenna once again exceeds the threshold value for the time period that has been set, the processor is once again switched into scanning mode.

Figure 2:
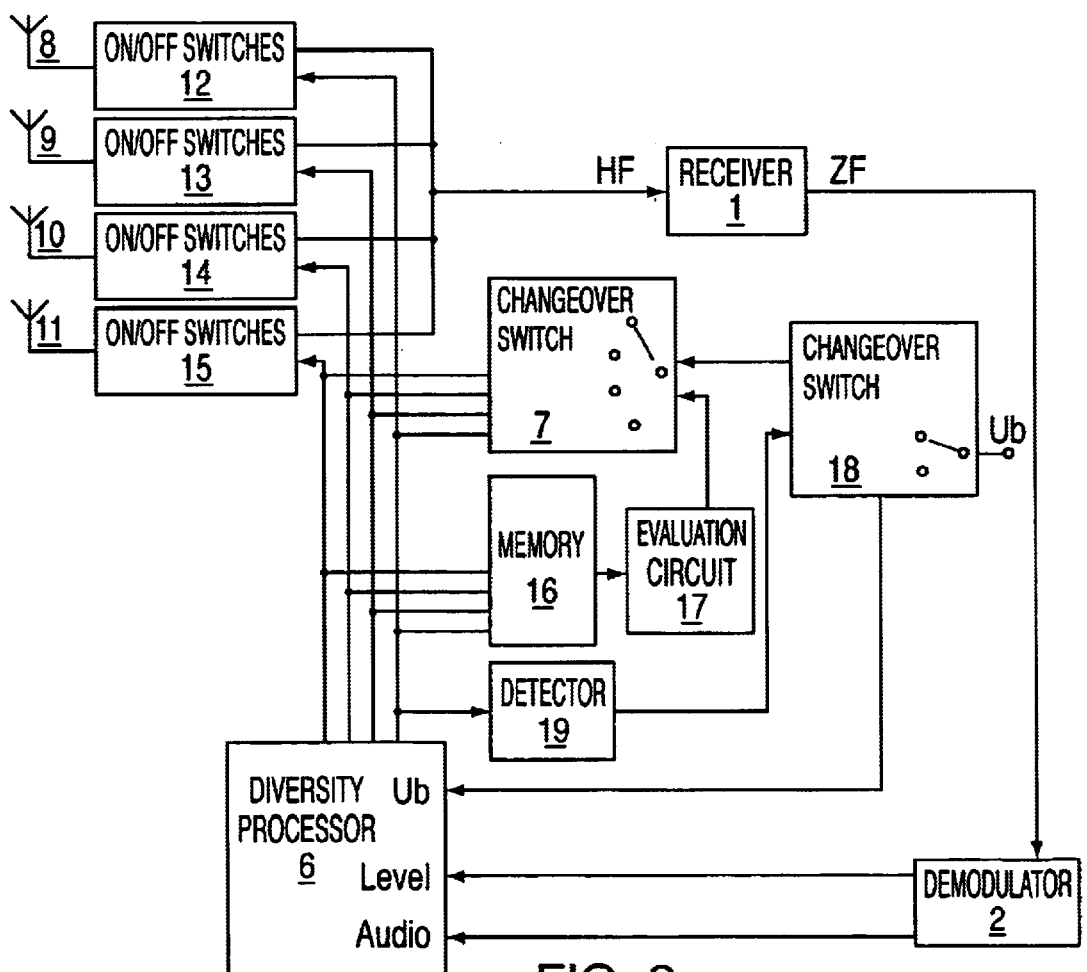
FIG. 2 shows a modification of the exemplary embodiment.

FIG. 2 shows the block diagram of a system for detecting switching speed at a control output terminal, with changeover to the antenna with the best reception. Parts identical to those in FIG. 1 are labeled with the same reference characters.

The HF signal of the present antenna 8, 9, 10, or 11, processed in the FM tuner and IF amplifier of receiver 1, is demodulated in demodulator 2 of the antenna diversity circuit. The audio signal and the level-equivalent DC voltage (level) from the demodulator are conveyed to diversity processor 6. The latter recovers therefrom the information as to when a changeover to the next antenna is to occur. It controls on/off switches 12 through 15.

Appended to the control line for on/off switch 12 is detector 19, which actuates changeover switch 18 in the presence of a defined changeover frequency. This switch supplies voltage Ub away from the diversity processor and instead conveys it via changeover network 7 to one of the control lines for on/off switches 12 through 15. The on/off switches can thereby be activated directly. Changeover switch 7 is controlled by evaluation circuit 17, which reads out memory 16 and detects which antenna was switched in for the longest time at the last pass.

When detector 19 detects a high switching frequency, diversity processor 6 is therefore switched off and the antenna most recently switched in for the longest time is switched on via changeover switch 7.

Changeover switch 18 is equipped with a timing member, meaning that after a defined time, the processor is switched on again in order to check whether reception conditions have improved in the meantime.

This variant also ensures that a fixed antenna is not selected until an interference-free signal is no longer present at any connected antenna, since the changeover occurs only when the processor is changing very frequently among the antennas.

The present invention was described above with reference to exemplary embodiments, with no limitation of the general idea of the present invention. A wide variety of variations is of course possible, resulting in different advantages of which some are recited below:

In any situation, it is advantageous if the changeover criterion is derived from the IF level. Evaluation of this value is particularly simple, since the demodulator in the diversity module furnishes a level-equivalent DC voltage. A time delay is connected, in this context, before the actual threshold switch, so that all the antennas are polled before the changeover to a fixed antenna.

It is particularly advantageous if the time delay is embodied as an integrator—in the simplest case as a lowpass filter—and the threshold switch as an operational amplifier connected as a comparator, since these components can be implemented economically and simply.

A further advantage results when the integrator is preceded by a further comparator, so that integration does not begin until the value has actually fallen below the threshold. This guarantees that the delay time is independent of the voltage jump of the level-equivalent DC voltage.

It is particularly advantageous if the switching frequency, rather than the IF level, is employed as the changeover criterion. This makes it possible to prevent the fixed antenna from being switched on at a low level even though the processor is not yet continually switching.

A further advantage results if, instead of evaluating all the control outputs, only one control output is evaluated as to switching frequency, since the circuit complexity is thereby considerably reduced. This is possible because, in all practical embodiments, the diversity processor always switches the antennas on and off in the same sequence.

It is furthermore advantageous if the main antenna is used as the fixed antenna, since the latter can be controlled very easily by way of the mode input of the diversity processor. It is particularly advantageous, however, if the antenna with the best reception is used as the fixed antenna. This requires a determination as to which antenna was switched on for the longest time at the last pass.

What is claimed is:

1. A circuit for changing over between frequency-modulated HF signals of individual antennas including more than two receiving antennas, comprising:

a control unit that changes over between the individual antennas as a function of a quality of an antenna output signal; and a detector for applying to the control unit a signal that effects a changeover to a fixed antenna of the more than two receiving antennas when signals of all the individual antennas fall below a defined minimum reception level;

wherein the detector senses a number of changeover operations between the individual antennas, and when the number of changeover operations per unit time exceeds a defined value, the detector applies to the control unit the signal that effects the changeover to the fixed antenna.

2. The circuit according to claim 1, wherein the control unit includes:

a demodulator that generates a signal from the antenna output signal that has been prepared, and a processor corresponding to a diversity processor and for controlling the changeover between the individual antennas.

3. The circuit according to claim 2, wherein:

the signal generated by the demodulator includes a level-equivalent DC voltage signal.

4. The circuit according to claim 2, wherein:

the antenna output signal is prepared into an IF signal.

5. The circuit according to claim 2, wherein the detector includes:

a delay circuit having a time delay corresponding at least to a time required by the control unit to poll all the individual antennas, and a threshold switch that detects that a reception level has fallen below the defined minimum reception level and that provides an output signal to the processor as a control signal for changing over to the fixed antenna.

6. The circuit according to claim 5, wherein:

the delay circuit includes an integration member.

7. The circuit according to claim 5, wherein:

the detector includes a second threshold switch that precedes the delay circuit.

8. The circuit according to claim 1, wherein:

the control unit resumes changing over between the individual antennas when the antenna output signal of the fixed antenna exceeds the defined minimum reception level for a specific time.

9. The circuit according to claim 1, wherein:

the signal that controls the changeover is present at the detector as an input signal.

10. The circuit according to claim 9, wherein:

the more than two receiving antennas include:

a main antenna that has a high reception performance and is designed for simultaneous FM and AM reception, and at least one further antenna that is only for FM reception.

11. The circuit according to claim 10, wherein:

the main antenna includes the fixed antenna.

12. The circuit according to claim 1, wherein:

the control unit stores a reception level furnished by each of the individual antennas.

13. A circuit for changing over between frequency-modulated HF signals of individual antennas including more than two receiving antennas, comprising:

a control unit that changes over between the individual antennas as a function of a quality of an antenna output signal; and a detector for applying to the control unit a signal that effects a changeover to a fixed antenna of the more than two receiving antennas when signals of all the individual antennas fall below a defined minimum reception level;

wherein the fixed antenna is that which furnished the best antenna output signal before a reception level fell below the defined minimum reception level, and wherein the control unit identifies which antenna was switched in for the longest time as a receiving antenna during a run-through before a reception level fell below the defined minimum reception level.

* * * * *